United States Patent [19]

Hyland

[11] Patent Number: 4,801,324
[45] Date of Patent: Jan. 31, 1989

[54] METHOD FOR OPTICAL FIBRE MANUFACTURE

[75] Inventor: Fred Hyland, Dartford, England

[73] Assignee: STC PLC, London, United Kingdom

[21] Appl. No.: 161,331

[22] Filed: Feb. 19, 1988

Related U.S. Application Data

[63] Continuation of Ser. No. 896,517, Aug. 14, 1986, abandoned.

[30] Foreign Application Priority Data

Aug. 21, 1985 [GB] United Kingdom ................. 8520946

[51] Int. Cl.⁴ ............................................ C03B 37/027
[52] U.S. Cl. ........................................ 65/3.11; 65/13; 65/29
[58] Field of Search ..................... 65/2, 3, 11, 13, 29

[56] References Cited

U.S. PATENT DOCUMENTS 3,791,172  2/1974  Manfre et al. ...................... 65/13 X
4,410,344 10/1983  Lyengar ............................. 65/13 X

FOREIGN PATENT DOCUMENTS 2146321  4/1985  United Kingdom ................... 65/13

Primary Examiner—Robert L. Lindsay
Attorney, Agent, or Firm—Lee & Smith

[57] ABSTRACT

In the manufacture of high quality optical fibre for telecommunications, a preform (1) is advanced towards a furnace (9) until a tip detector (5) automatically stops the preform (1) at a predetermined position (11) in front of the furnace to provide a reference datum for a second mode of operation in which the computer (12) can be initiated manually (12B) to advanve (4) the preform (1) by a predetermined amount into the furnace to commence drawing the optical fibre. Preferably the tip detector is a paddle (6) pivotally mounted (7) and operates an optical sensor (8).

8 Claims, 1 Drawing Sheet

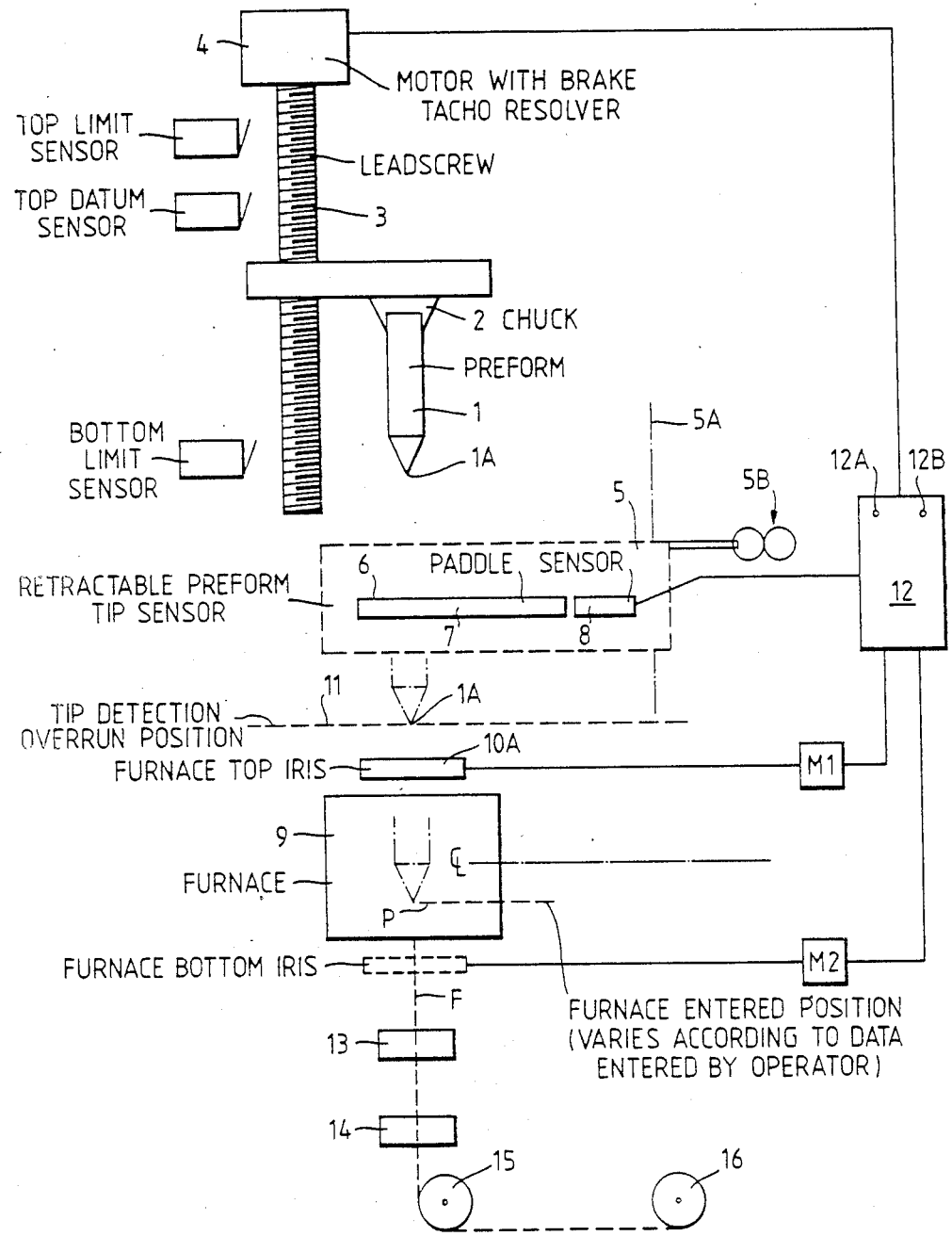

METHOD FOR OPTICAL FIBRE MANUFACTURE

This application is a continuaton of application Ser. No. 896,517, filed Aug. 14, 1986 now abandoned.

BACKGROUND OF THE INVENTION

This invention relates to manufacturing optical fibre, particularly to the automatic control of the manufacturing process.

High quality optical fibre for transmission systems needs to have the mechanical properties sufficient to withstand stresses to which it is subjected in use. A typical fibre has an outside diameter of 125 microns and is drawn from a glass preform of about 17 mm diameter and about 1.0 m long. Conventionally the optical fibre preform is inserted slowly into a furnace which melts the end of the preform from which is drawn the optical fibre. The preform is held in a chuck which is driven by a precision drive motor and lead screw which feeds the preform at a slow, predetermined rate in to the furnace.

Not all the preform can be converted into optical fibre partly because end portions of the preform do not have a uniform diameter and partly because that end portion of the preform which is held in the chuck cannot easily be released for melting in order to manufacture the optical fibre. It is therefore necessary for the operator of the optical fibre pulling tower to judge when the useful portion of the optical fibre preform has been drawn, and at that point to shut down the pulling process by shutting down the furnace, stopping the capstan and withdrawing the remainder of the preform out of the furnace.

In commencing the process the tip of the preform is inserted into the furnace which has in the meantime been run up to operating temperature, and as the first portion of optical fibre appears from underneath the furnace it is slowly fed down through the various stages of the pulling process, including fibre diameter measuring device, coating applicator coating curing stage and onto the capstan. This initial start-up procedure is difficult to do manually and relies heavily on the expertise of the operator and it is an object of the present invention to alleviate these difficulties.

SUMMARY OF THE INVENTION

According to the present invention there is provided a method of manufacturing optical fibre by progressively melting a preform in a furnace and drawing a fibre from the molten preform, the method comprising the steps of:

(a) mounting the preform in a feed mechanism driven by a motor;
(b) advancing the preform by means of said motor, towards the furnace and a preform sensor able to sense a predetermined position of the preform and operate a switch in response thereto;
(c) arranging said sensor to operate the switch and thereby determine the position of the preform in relation to the furnace, wherefrom a second mode of operation can be initiated in which the feed mechanism feeds the preform automatically by said motor in to the furnace by a predetermined amount from said predetermined position to commence drawing the optical fibre.

According to another aspect of the present invention there is provided apparatus for manufacturing an optical fibre comprising a furnace, means for supporting a preform and advancing the preform into the furnace to melt the preform, means for drawing a fibre from the molten preform, and means to sense the preform at a predetermined position in front of the furnace and to operate a switch in response thereto whereby to determine when the preform occupies said predetermined position and means for feeding the preform automatically a predetermined amount from said predetermined position to commence drawing the optical fibre.

Conveniently and preferably the sensor comprising a tip-detector which senses the tip of the preform. Conveniently the tip-detector comprises a pivotally mounted member mechanically linked to a optical switch so that the tip of the preform will physically move the pivotally mounted member to operate the switch.

Conveniently such a pivotally mounted member is also mounted for movement away from the tip of the preform by or after actuation of said switch. A drive mechanism is provided which moves the sensor away from the path of the preform.

Preferably the sensor is pivotally mounted about an axis parallel to the longitudinally axis of the preform so that the sensor can be swung away from the path of the preform about said parallel pivotal axis.

Preferably a the second mode of operation following operation of the tip detector, incorporates the opening of an iris member which closes the entrance to the furnace, thereby effectively sealing the furnace from the surrounding atmosphere and maintaining an inert atmosphere within the furnace, e.g. argon.

The invention enables the preform to be advanced to exactly the correct position for the commencement of fibre drawing in the furnace completely automatically by relatively unskilled operators. Conveniently a third mode of operation can be initiated by a second sensor switch which senses the final position of the preform at the point where the usable body portion of the preform has been drawn into fibre, to automatically reverse the feed mechanism to extract the remainder of the preform from the furnace, close the iris and shut down the furnace and other operations during ramp-down of the pulling operation.

BRIEF DESCRIPTION OF THE DRAWINGS

In order that the invention can be clearly understood reference will now be made to the accompanying drawing which shows diagrammatically an embodiment of the present invention.

DESCRIPTION OF THE PREFERRED EMBODIMENTS

Referring to FIG. 1 of the drawings an optical fibre preform 1 is held vertically in a chuck 2 supported on a leadscrew 3 which is driven by a motor 4 which has a brake and a tachometer resolver.

A retractable preform tip detector 5 comprises basically a paddle 6 pivotally mounted at 7 and controlling an optical sensor switch 8.

A furnace 9 is closed at the top by an iris 10A and at the bottom by an iris 10B.

A computer 12 controls the motor 4 in various modes of operation as instructed by the operator.

In a first mode of operation the operator presses a first button 12A and the computer drives the motor 4 until the tip 1A of the preform touches the left hand side of the paddle 6, causing the paddle to tilt about pivot 7. This is sensed by sensor 8 which sends a signal to the computer which applies the brake to the motor and the tip stops at a position indicated as an overrun position by broken line 11. This is where the tip comes to rest and this state is indicated on the computer control panel and the computer awaits the next operation instruction to proceed. The computer uses this position sensed by switch 8 as a reference datum for subsequent movements.

In the furnace 9 is a hot-spot and it is critical for the preform tip to be very accurately located in this hot-spot as drawing of the fibre commences and proceeds. The operator now determines when the pulling tower is ready to accept the preform, the computer having been pre-programmed to automatically advance the preform by a predetermined amount from the position sensed by the tip detector. When ready, button 12B is pushed and the computer then plunges the preform tip 1A the predetermined distance into the furnace 9, which in this particular embodiment is just below the centre-line CL at position P, which varies according to data entered into the computer. At the same time the top iris 10A is opened by motor M also under control of the computer, to allow the preform through and closes down to provide a continuing seal to the furnace with a gap of about 1 mm around the preform 1. The irises 10A, 10B prevent the escape of purging gases e.g. argon, from the furnace and thus minimises wastage.

Also as the switch 8 operates, the computer swings the tip detector 5 out of the way of the preform, by pivotting it about the vertical axis 5A parallel to the longitudinal axis of the preform 1. A double acting hydraulic cylinder 5B achieves this.

Back-up sensors can be provided to avoid the problem of sensor failure.

After about 10 minutes a glass "drop-off" will come out of the bottom of the furnace, by which time the iris 10B will have been opened and then closed back around the fibre F which is starting to be drawn. The drop off is cut-off and the fibre threaded through the coating stage 13 and curing stage 14 and onto the capstan 15 and take off drum 16. At this stage the capstan is programmed to pull at about 4 metres per minutes and the preform feed rate is commensurately slow to match. When the coating application is primed and ready the pulling procedure is ramped-up.

We claim:

1. A method of manufacturing optical fibre by progressively melting a preform in a furnace and drawing a fibre from the molten preform said method being controlled by a computer, the method comprising:
   (a) a first mode of operation including entering into the computer data defining the length of that portion of said preform which is useable to make said fibre and the distance of said portion from a tip of the preform;
   mounting the preform in a feed mechanism driven by a motor under the control of said computer;
   (b) advancing the preform by means of said motor towards the furnace and towards a preform sensor so constructed and arranged to sense a predetermined position of the preform above the furnace and operate a switch in response thereto, prior to drawing a fibre from said preform, and completing said first mode of operation when said switch has operated; and
   (c) utilising said switch operation to initiate a second mode of operation under the control of said computer in which the feed mechanism feeds the preform tip automatically by said motor into said furnace by a predetermined amount from said predetermined position and commencing drawing the optical fibre during ramp up until said usable portion has reached the furnace, and continuing to draw said fibre until said useable portion has been made into said fibre.

2. A method as claimed in claim 1 wherein the sensor senses the tip of the preform.

3. A method as claimed in claim 1, wherein the switch stops movement of the preform and the second mode of operation is initiated manually.

4. A method as claimed in claim 1 wherein the sensor comprises a moveable member located in the path of the preform as it advances towards the furnace, and wherein the preform touches the member and moves the member to operate the switch.

5. A method as claimed in claim 1, wherein the sensor is moved away from the preform as the preform is moved is said second mode, or beforehand.

6. Apparatus for manufacturing an optical fibre comprising a furnace, means for supporting a preform and advancing the preform into the furnace to melt the preform, means for drawing a fibre from the molten preform, and means to sense the preform at a predetermined position in front of the furnace and to operate a switch in response thereto whereby to determine when the preform occupies said predetermined position and means for feeding the preform automatically a predetermined amount from said predetermined position to commence drawing the optical fibre.

7. A method as claimed in claim 2, wherein the switch stops movement of the preform and the second mode of operation is initiated manually.

8. A method as claimed in claim 2 wherein the sensor comprises a moveable member located in the path of the preform as it advances toward the furnace, and wherein the preform touches the member and moves the member to operate the switch.

* * * * *